(12) United States Patent
Swallow

(10) Patent No.: US 6,751,190 B1
(45) Date of Patent: Jun. 15, 2004

(54) MULTIHOP NESTED TUNNEL RESTORATION

(75) Inventor: George Swallow, Concord, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/314,041

(22) Filed: May 18, 1999

(51) Int. Cl.[7] .............................................. G01R 31/08
(52) U.S. Cl. ........................................ 370/217; 370/242
(58) Field of Search ................................ 370/216, 217, 370/218, 221, 222, 225, 242, 243, 248, 356, 401, 400, 255, 395, 241, 351, 352, 357

(56) References Cited

U.S. PATENT DOCUMENTS

| | | | |
|---|---|---|---|
| 5,146,452 A | * 9/1992 | Pekarske | 370/228 |
| 5,764,624 A | * 6/1998 | Endo et al. | 370/218 |
| 5,768,256 A | * 6/1998 | Allen et al. | 370/218 |
| 5,999,286 A | * 12/1999 | Venkatesan | 359/117 |
| 6,092,113 A | 7/2000 | Maeshima et al. | |
| 6,167,025 A | * 12/2000 | Hsing et al. | 370/216 |
| 6,185,210 B1 | 2/2001 | Troxel | |
| 6,324,162 B1 | * 11/2001 | Chaudhuri | 370/225 |
| 6,442,131 B1 | * 8/2002 | Kondo | 370/218 |
| 6,452,915 B1 | 9/2002 | Jorgensen | |

OTHER PUBLICATIONS

Callon, R. et al., "A Framework for Multiprotocol Label Switching," Internet Draft published at WWW.ietf.org/internet–drafts/draft–ietf–mpls–framework–02.txt; May 1998.

Branden, R., et al., "Resource ReSerVation Protocol (RSVP)", Internet Draft, published at WWW.ietf.org/rfc/rfc2205.txt; Sep. 1997.

* cited by examiner

Primary Examiner—Dang Ton
Assistant Examiner—Phuc Tran
(74) Attorney, Agent, or Firm—Hamilton, Brook, Smith & Reynolds, P.C.

(57) ABSTRACT

A network communications tunnel is established by assigning a unique label to each communications link between adjacent nodes in a pre-defined network path. A node's unique label is used to forward a data packet to the adjacent node in the pre-defined path. The unique labels for all the nodes in the pre-defined path are stored by each node in the tunnel. A bypass tunnel to bypass a node in the pre-defined path may be established to reroute data packets around a failed communication link in the tunnel. The bypass tunnel may be established before the communication link failure providing fast tunnel restoration.

26 Claims, 11 Drawing Sheets

SESSION OBJECT

SENDER TEMPLATE OBJECT

FILTER SPEC OBJECT

408

| LENGTH | CLASS-NUM | C-TYPE |
|---|---|---|
| TYPE LENGTH | 610 IPv4 ADDRESS | |
| IPv4 ADDRESS | MASK | PADDR |
| TYPE LENGTH | 612 IPv4 ADDRESS | |
| IPv4 ADDRESS | MASK | PADDR |
| TYPE LENGTH | 614 IPv4 ADDRESS | |
| IPv4 ADDRESS | MASK | PADDR |

EXPLICIT ROUTE OBJECT

| LENGTH | CLASS-NUM | C-TYPE |
|---|---|---|
| RESERVED | L3PID | |

— 616

LABEL REQUEST OBJECT

FIG. 6E

LABEL OBJECT

RECORD ROUTE OBJECT

INCOMING LABEL MAP

MULTIHOP NESTED TUNNEL RESTORATION

BACKGROUND OF THE INVENTION

There is a growing need for realtime data transfer on the Internet to support realtime applications such as, teleconferencing and live video. However, the Internet is not designed for realtime data transfer. Data is transferred on the Internet using Transmission Control Protocol ("TCP")/Internet Protocol ("IP"). TCP/IP includes four layers, the application layer, the transport layer, the network layer and the link layer.

Data originates in the application layer, for example, the application data may be frames of a live video to be transmitted from a source node to a destination node. The transport layer includes the TCP protocol. The TCP protocol in the source node processes the frames of the live video into TCP data packets and assigns a sequence number to each packet of data. The TCP protocol in the destination node reassembles the TCP data packets transmitted by the source node using the data packet's sequence numbers.

The network layer includes the IP protocol. The IP protocol adds an IP address for the destination node to each TCP data packet. The size of the IP address added is dependent on the version of the IP protocol used. Version 4 of the IP protocol ("IPv4") adds a 32 bit IP address to each TCP data packet. Version 6 of the IP protocol ("IPv6"), adds a 128 bit IP address to each TCP data packet. The link layer in the source node sends the TCP data packets including IP addresses over the physical medium. The link layer in the destination node receives the TCP data packets sent by the source node over the physical medium.

By dividing the application data into TCP data packets and providing the IP address for the destination node on each TCP data packet, each TCP data packet may travel on a different path between the source node and the destination node. Due to congestion in nodes along paths from the source node to the destination node, TCP data packets sent on different paths may not arrive in order.

For real-time data, for example, a live video the application can not wait until all the data packets are reassembled because the data packets are used as soon as they arrive at the destination node. If a data packet does not arrive at the destination node in time this delayed packet may be noticeable, for example, a delay in a data packet for live video may result in a loss of one or more frames of the video.

Extensions to TCP/IP have been proposed by the Internet Engineering Task Force ("IETF") to add support for realtime data transfer. One proposed extension to provide in-order delivery of data packets for realtime data transfer between a source node and a destination node is Multiprotocol Label Switching (MPLS) described in "A Framework for Multiprotocol Label Switching" by Callon et al. in a Network Working Group Internet Draft published at http://www.ietf.org/internet-drafts/draft-ietf-mpls-framework-02.txt on May 21, 1998 incorporated herein by reference. MPLS adds a label to a data packet to guide the data packets through nodes along a pre-defined path in a network. The pre-defined path is called a Label Switched Path ("LSP") Tunnel. LSP tunnels may be established using the Resource ReSerVation Protocol ("RSVP") described in "Resource ReSerVation Protocol (RSVP) Version 1 Functional Specification" by Branden et al. RSVP, Network Work Group, Request for Comment, 2205 published at http://www.ietf.org/rfc/rfc2205.txt on September 1997 incorporated herein by reference.

A "tunnel" in general, therefore, as used herein refers to a pre-defined path through networks. The "tunnel" may be established by RSVP or any other protocol now or hereafter established to support real time data transfer.

A tunnel failure may occur, for example, due to a hardware failure in one or more nodes or a communication link between nodes, requiring a new tunnel to be established to restore data packet transfer to transfer data. Until the new tunnel is established, data packets for the realtime application such as, live video are not being transmitted to the destination node.

SUMMARY OF THE INVENTION

The present invention provides a mechanism for quickly repairing a failure in a communications link and has particular application to failed communications links in tunnels established for realtime data transfer. The tunnel is established by assigning a label to each communication link. A plurality of labels for each communication link is stored in a node prior to any communication failure. The node may determine the label assigned to a communication link from the stored labels. After the detection of link failure the tunnel is repaired by redirecting data transfer for the tunnel around the failed communication link. The data transfer is redirected on an established bypass tunnel.

The labels are stored in the node by forwarding a message with a label table to each node in the tunnel. The node adds its address and the label for its communication link for the tunnel to the label table and stores a copy of the label table.

The nodes through which data transfer for the tunnel is to be directed may be determined before the communications link failure is detected. The bypass tunnel for redirecting data transfer for the tunnel may be established before the communications link failure is detected.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 6A–6G show the format of the objects shown in the Reservation Message in FIG. 5 and the Path Message shown in FIG. 4;

DETAILED DESCRIPTION OF THE INVENTION

Figure 1:
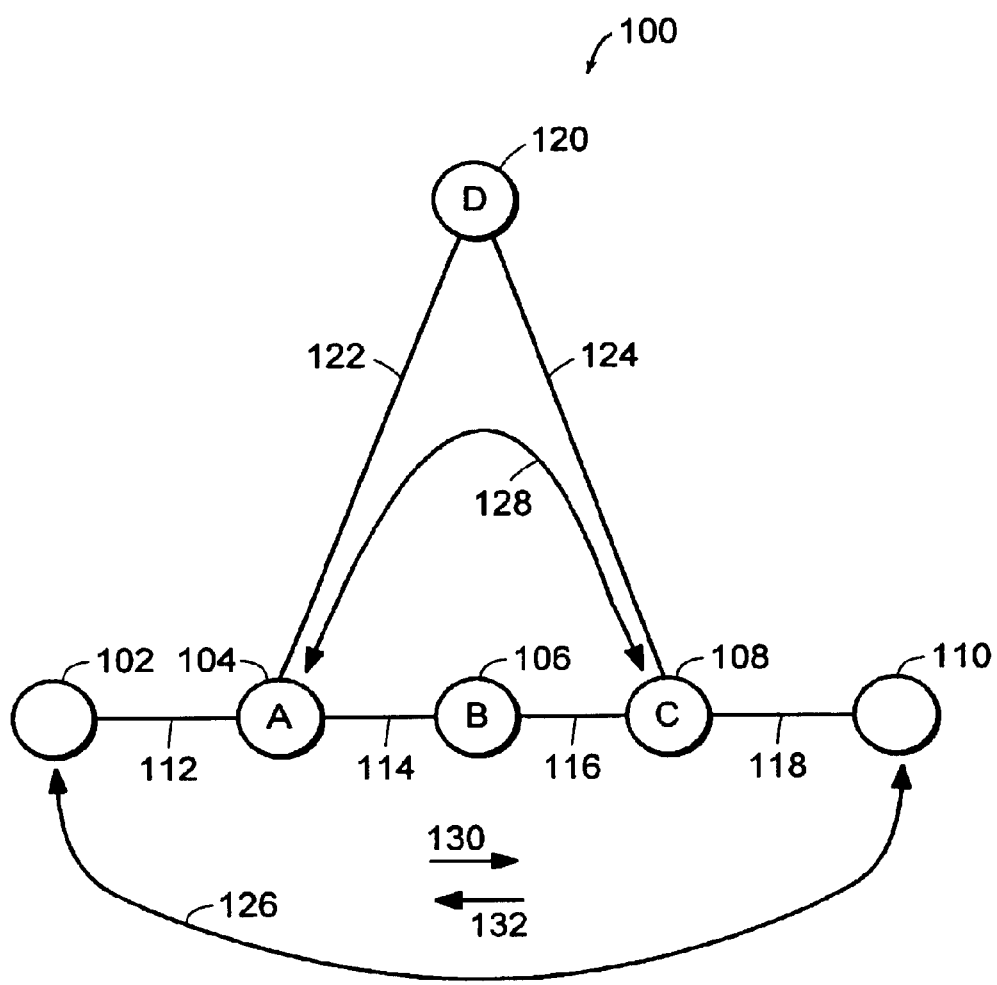
FIG. 1 is a schematic of a first embodiment of the present invention.

FIG. 1 shows a portion of a network 100 including a transmit endpoint 102, a receive endpoint 110 and intermediate nodes 104, 106, 108 and 120. A primary tunnel 126 is established between the transmit endpoint 102 and the receive endpoint 110 by assigning labels to communication links 112, 114, 116 and 118.

After the primary tunnel 126 is established, a data packet is transferred between the transmit endpoint 102 and the receive endpoint 110 as follows: transmit endpoint 102 transmits the data packet on communications link 112 together with the label for communications link 112 to intermediate node_A 104, intermediate node_A 104 transmits the data packet on communications link 114 together with the label for communications link 114 to intermediate node_B 106, intermediate node_B 106 transmits the data packet on communications link 116 together with the label for communications link 116 to intermediate node_C 108, intermediate node_C 108 removes the label from the data packet and transmits the data packet to receive endpoint 110.

A bypass tunnel 128 may also be established between intermediate node_A 104 and intermediate node_C 108 by assigning labels to communication links 122 and 124. The bypass tunnel 128 may be used to transfer data for the primary tunnel 126 for example, if there is a link failure between intermediate node_A 104 and intermediate node_B 106. The link failure may be caused by a failure in intermediate node_B 106 or a failure in the physical connection between intermediate node_A 104 and intermediate node_B 106. Intermediate node_A 104, intermediate node_B 106, intermediate node_C 108, intermediate node_D 120, transmit endpoint 102 and receive endpoint 110 may be host computers or routers.

Support for TCP/IP, RSVP and MPLS is provided in each of the intermediate nodes 104, 106, 108 and 120, and endpoints 102 and 110. This embodiment of the present invention is described for nodes implementing IPv4. However, in other embodiments intermediate nodes 104, 106, 108 and 120, and endpoints 102 and 110 may implement IPv6 or any other Internet protocol.

RSVP establishes the primary tunnel 126 for data transfer by reserving resources for communications links 112, 114, 116 and 118, and enabling intermediate nodes 104, 106 and 108 to transfer the specified application data by assigning labels to the communication links 112,114,116,118 between nodes. RSVP transfers control information in the form of messages only, no TCP data packets are transferred. An RSVP control message to reserve link resources, the Path Message 400 (FIG. 4) is transmitted between the transmit endpoint 102 and the receive endpoint 110 downstream in direction 130. An RSVP control message, the Reservation Message 500 (FIG. 5) is transmitted from the receive endpoint 110 to the transmit endpoint 102 upstream in direction 132 to inform the transmit endpoint 102 that the requested resources for the primary tunnel 126 have been reserved.

Figure 2:
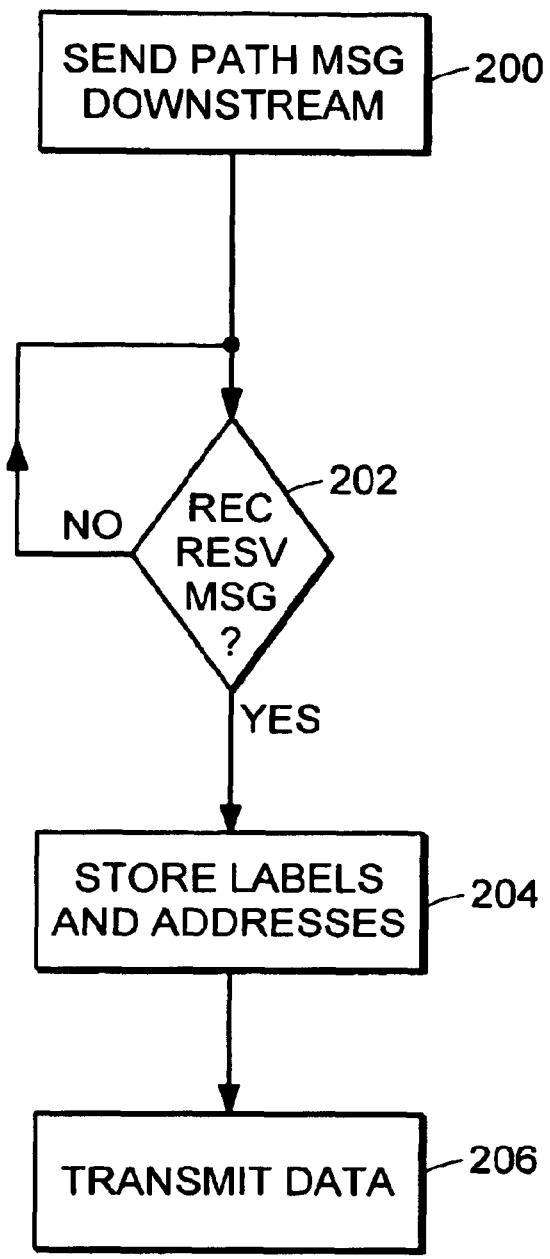
FIG. 2 is a flow diagram of a method implemented in any of the transmit endpoints shown in FIG. 1, for establishing a tunnel.
Figure 3:
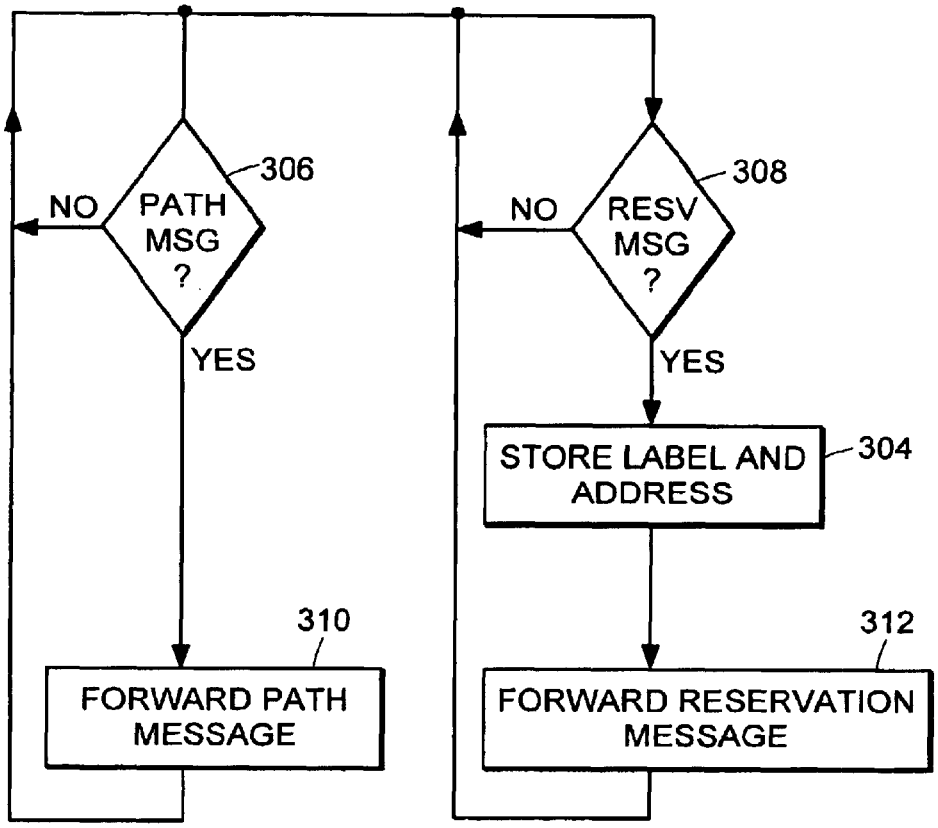
FIG. 3 is a flow diagram of a method, implemented in any of the intermediate nodes shown in FIG. 1, for establishing a tunnel.

FIGS. 2 and 3 in conjunction with FIG. 1, FIG. 4, FIG. 5 and FIGS. 6A–6G describe how RSVP reserves resources and enables the transfer of specified application data for the tunnel. FIG. 2 shows how the transmit endpoint 102 (FIG. 1) sets up the primary tunnel 126 (FIG. 1) to connect the transmit endpoint 102 (FIG. 1) to the receive endpoint 110 (FIG. 1). FIG. 3 shows how any of the intermediate nodes 104, 106, 108, 120 processes RSVP control messages sent from the transmit endpoint 102 (FIG. 1) and the receive endpoint 110 (FIG. 1). The RSVP control messages for setting up the primary tunnel 126 (FIG. 1) between the transmit endpoint 102 (FIG. 1) and the receive endpoint 110 (FIG. 1) include the Path Message 400 shown in FIG. 4 and the Reservation Message 500 shown in FIG. 5. Objects for the Path Message 400 and Reservation Message 500 are shown in FIGS. 6A–6E.

Referring to FIG. 2, in step 200, the transmit endpoint 102 (FIG. 1) sends a Path Message 400 (FIG. 4) downstream in direction 130 (FIG. 1) towards the receive endpoint 110 (FIG. 1). The format of the Path Message 400 is shown in FIG. 4.

Figure 4:
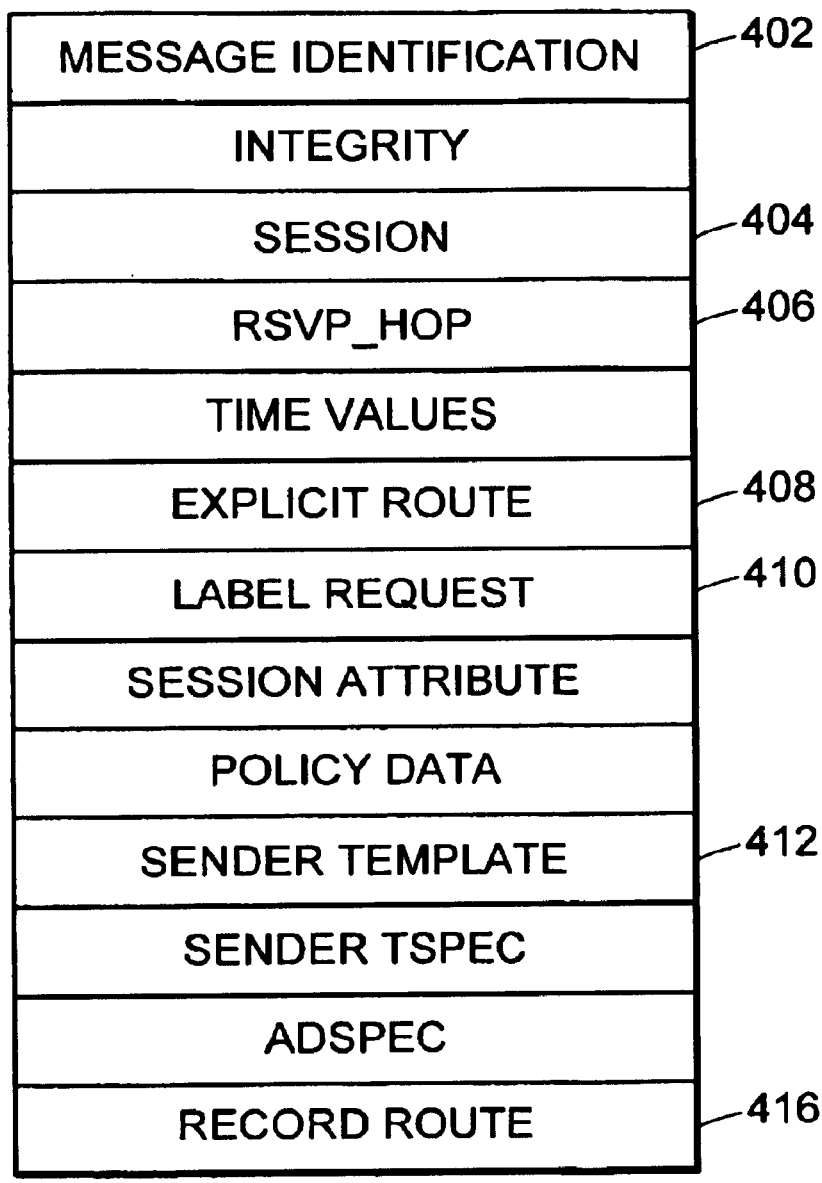
FIG. 4 shows the format of the Path Message sent from the transmit endpoint to the receive endpoint to establish the tunnel shown in FIG. 1.

Referring to FIG. 4, the Message Identification Object 402 identifies the message type as a Path Message 400. The Session Object 404 identifies the session. The format of the Session Object 404 is shown in FIG. 6A.

Figure 6A:
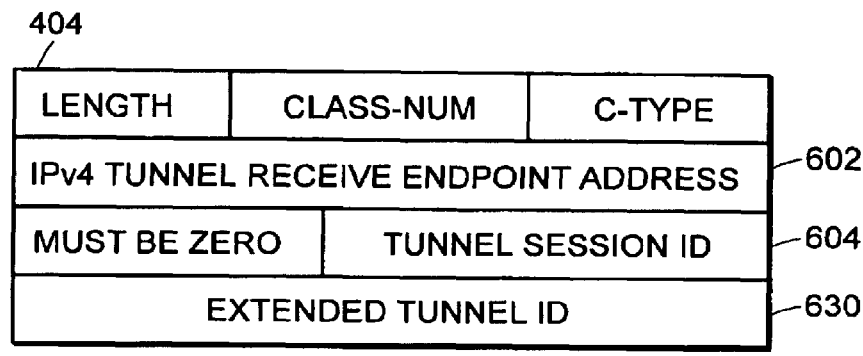

Referring to FIG. 6A, the Session Object 404 provides the IPv4 Endpoint Address 602 for the receive endpoint 110 (FIG. 1), a Tunnel Session Identification 604 indicating a value for the primary tunnel 126 (FIG. 1) and an Extended Tunnel Identification 630 for further defining the session.

Continuing with FIG. 4, the RSVP_HOP Object 406 includes the address of the transmit endpoint 102 (FIG. 1) in IPv4 format. The Explicit Route Object 408 includes a list of the IPv4 addresses for the intermediate nodes 104, 106, 108 in the primary tunnel 126 (FIG. 1). The format of the Explicit Route Object 408 is shown in FIG. 6D.

Referring to FIG. 6D, to set up an explicit route between the transmit endpoint 102 (FIG. 1) and the receive endpoint 110 (FIG. 1), the IPv4 address for intermediate node_A 104 (FIG. 1) is stored in IPv4 address 610, the IPv4 address for intermediate node_B 106 (FIG. 1) is stored in IPv4 address 612, and the IPv4 address for intermediate node_C 108 (FIG. 1) is stored in IPv4 address 614.

Continuing with FIG. 4, the Label Request Object 410 indicates that the transmit endpoint 110 (FIG. 1) is requesting a label to be assigned for communication link 112 (FIG. 1) between the transmit endpoint 110 (FIG. 1) and intermediate node_A 104. The transmit endpoint 110 (FIG. 1) transmits the returned assigned label with each data packet associated with the application data to be transmitted on the primary tunnel 126 (FIG. 1). The format of the Label Request Object 410 is shown in FIG. 6E.

Referring to FIG. 6E, the identifier of the layer 3 protocol, for example, the Ethernet protocol or any other layer 3 protocol is provided in L3PID 616.

Continuing with FIG. 4, the Sender Template Object 412 includes the IPv4 address of the transmit endpoint 102 (FIG. 1). The format of the Sender Template Object 412 is shown in FIG. 6B.

Figure 6B:
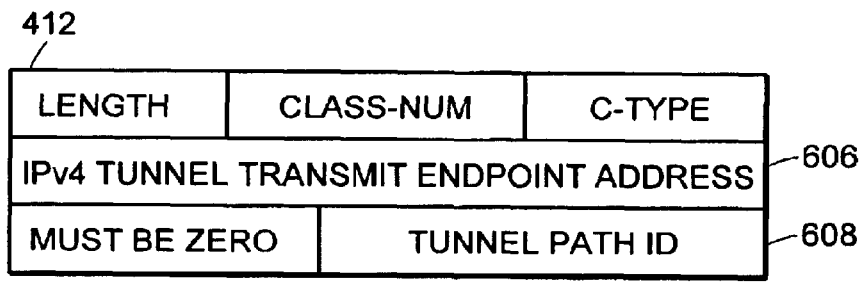

Referring to FIG. 6B, the IPv4 address of the transmit endpoint 102 (FIG. 1) is stored in IPv4 Tunnel Sender Address 606 and a tunnel path identification value indicating the primary tunnel 126 (FIG. 1) is stored in Tunnel Path Identification 608.

Continuing with FIG. 4, the Record Route Object 416 contains the IPv4 address of the transmit endpoint 102 (FIG. 1). The format of the Record Route Object 416 is shown in FIG. 6G. The IPv4 address of the transmit endpoint 102 (FIG. 1) is stored in IPv4 Addr 610.

FIG. 3 is the flow diagram of a method implemented in any of intermediate nodes 104 (FIG. 1), 106 (FIG. 1) or 108 (FIG. 1) for establishing a tunnel. In step 306 if any of the intermediate nodes 104 (FIG. 1), 106 (FIG. 1) or 108 (FIG. 1) on the primary tunnel 126 (FIG. 1) receives a Path Message 400, the Path Message 400 is forwarded in step 310 to the adjacent node downstream in direction 130. If the resources requested are available to the intermediate node to establish the communication link for the primary tunnel 126.

For example, if intermediate node_A 104 (FIG. 1) receives a Path Message 400 from transmit endpoint 102 (FIG. 1), intermediate node_A 104 (FIG. 1) forwards the Path Message 400 to intermediate node_B 106 (FIG. 1). Before forwarding the Path Message 400 to intermediate node_B 106 (FIG. 1), intermediate node_A 104 (FIG. 1) modifies the Path Message 400. The Path Message 400 is modified by changing the RSVP_HOP Object 406 to the address of intermediate node_A 104 (FIG. 1) in IPv4 format.

Continuing with FIG. 2, in step 200, after the Path Message 400 is sent by the transmit endpoint 102 (FIG. 1), the transmit endpoint 102 (FIG. 1) waits for a Reservation Message 500 (FIG. 5) to be received from the receive endpoint 110 (FIG. 1) indicating that the reservation is complete.

Figure 5:
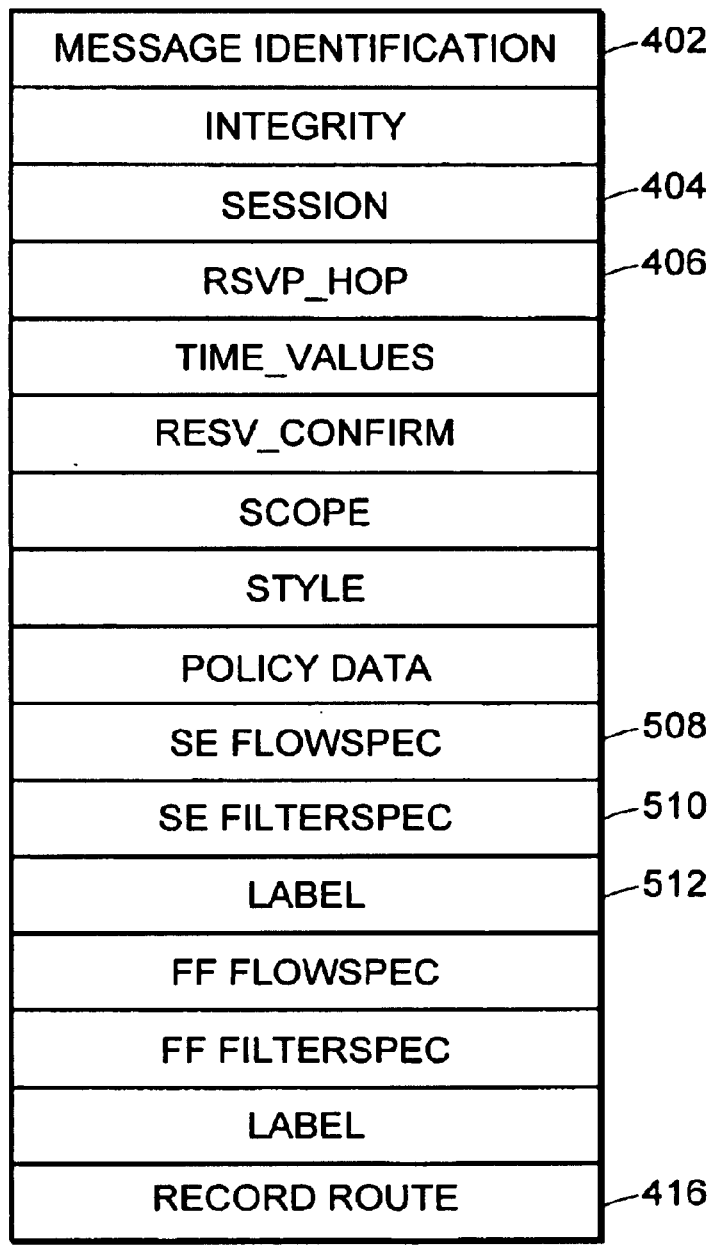
FIG. 5 shows the format of the Reservation Message sent from the transmit endpoint to the receive endpoint to establish the tunnel shown in FIG. 1.

FIG. 5 shows the format of the Reservation Message 500. The Message Identification 402 identifies the message type as a Reservation Message 500. The format of the Session Object 404 is shown in FIG. 6A.

Returning to FIG. 6A, to establish the primary tunnel 126 (FIG. 1) between the transmit endpoint 102 (FIG. 1) and the receive endpoint 110 (FIG. 1), the primary tunnel's 126 (FIG. 1) receive endpoint address 110 (FIG. 1) in IPv4 format is stored in the IPv4 Endpoint Address 602, a value indicating the primary tunnel 126 (FIG. 1) is stored in the Tunnel Session Identification 604 and a value further defining the primary tunnel 126 (FIG. 1) is stored in the Extended Tunnel Identification 630.

Continuing with FIG. 5, the RSVP_HOP Object 406 includes the address of intermediate node_A 104 (FIG. 1) in IPv4 format. The Shared Explicit Flowspec Object 508 specifies the data packet types for which resources have been reserved. For the standard RSVP Shared Explicit Style, the Shared Explicit Filter Spec Object 510 specifies the data packet types for which resources have been reserved and is used to identify the tunnel path. When used with MPLS, the Label Object 512 is used to identify those data packet types. The format of the Shared Explicit Filter Spec Object 510 is shown in FIG. 6C.

Figure 6C:
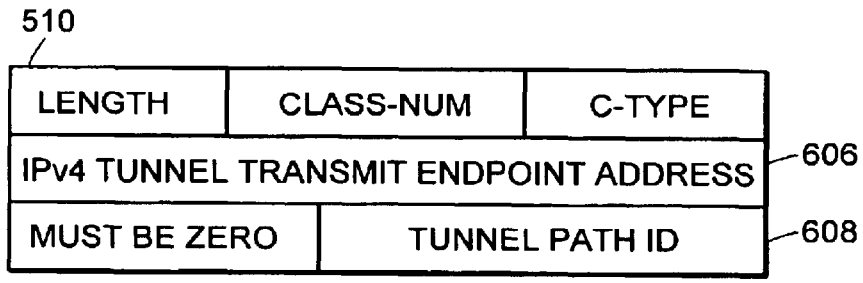

Referring to FIG. 6C, the Shared Explicit Filter Spec Object 510 includes the IPv4 address of the transmit endpoint 102 (FIG. 1) stored in IPv4 Tunnel Sender Address 606 and the value of the tunnel path identification, for example, '1' assigned to the primary tunnel 126 (FIG. 1) in tunnel path ID 608.

Continuing with FIG. 5, the Label Object 512 provides a label assigned by the adjacent node. For example, the Reservation Message 500 forwarded from intermediate node_A 104 (FIG. 5) to transmit endpoint 102 (FIG. 1) provides the label assigned to communication link 112 (FIG. 1). The label assigned to communication link 112 (FIG. 1) is transmitted with all data packets transmitted from transmit endpoint 102 (FIG. 1) for the primary tunnel 126 (FIG. 1). The format of the Label Object 512 is shown in FIG. 6F.

Figure 6F:
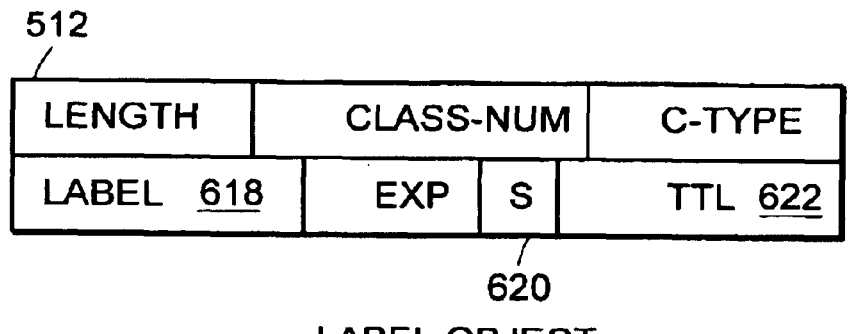
Figure 6G:
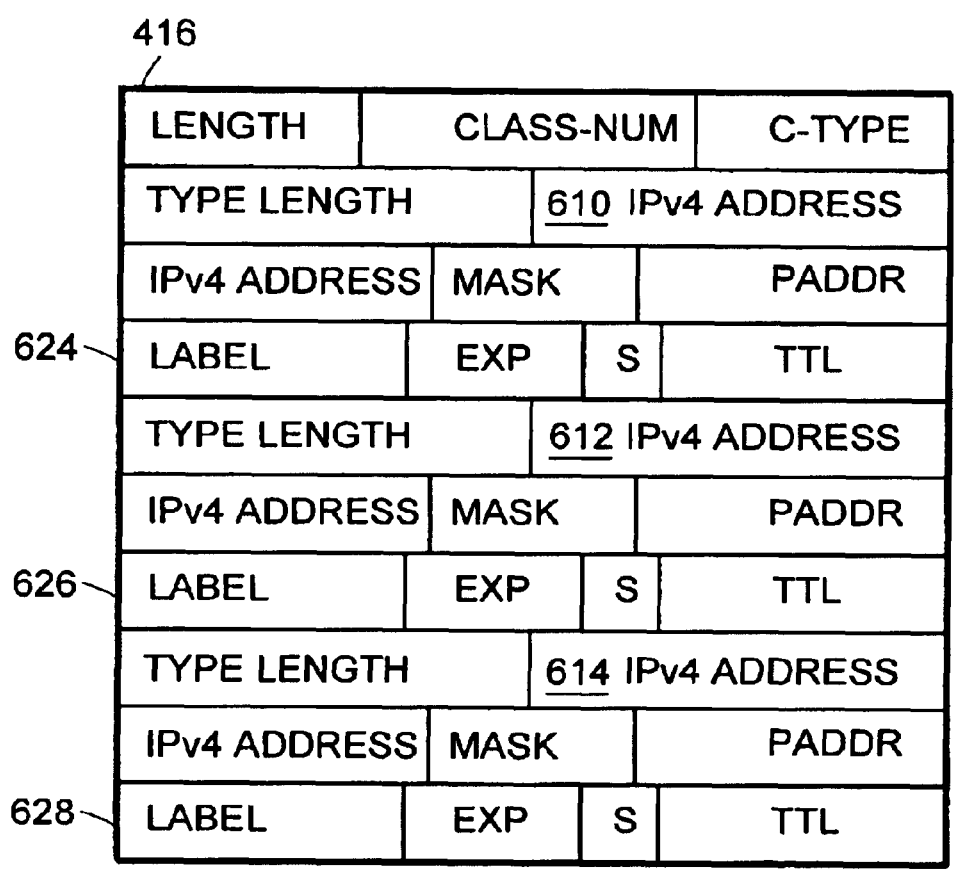

Referring to FIG. 6F, the Label Object 512 includes a label 618, a last label bit 620 indicating whether the label is the last label in a label stack structure and a Time To Live 622 value indicating how long the label is assigned to the communication link.

Continuing with FIG. 5, the Record Route Object 416 contains the IPv4 addresses of all the nodes 112 (FIG. 1), 114 (FIG. 1), 116 (FIG. 1) in the primary tunnel 126 (FIG. 1).

Returning to FIG. 3, in step 308 one of the intermediate nodes 104 (FIG. 1), 106 (FIG. 1) or 108 (FIG. 1) for example, intermediate node_A 104 (FIG. 1) on the primary tunnel 126 (FIG. 1) receives a Reservation Message 500 from an adjacent node, intermediate node_B 106 (FIG. 1).

In step 304, the forward path label assigned by intermediate node_B 106 (FIG. 1) for communications link 114, provided in the label field 618 (FIG. 6F) of the Label Object 512 (FIG. 5) in the Reservation Message 500 is stored in intermediate node_A 104 (FIG. 1). Intermediate node_A 104 modifies the Reservation Message 500 by changing the RSVP_HOP Object 406 (FIG. 4) to the address of intermediate node_A 104 (FIG. 1) in IPv4 format and by adding its address (the address of the intermediate node_A 104 (FIG. 1)) in IPv4 format and the label for communication link 114 between intermediate node_A 104 and intermediate node_B 106 to the Record Route Object 416.

Intermediate node_A assigns a label for the communication link 112 between intermediate node_A 104 and transmit endpoint 102. The label is stored in the label field 618 (FIG. 6F) in the Label Object 512 (FIG. 5) in the Reservation Message 500 to be forwarded to transmit endpoint 102.

In step 312 intermediate node_A 104 forwards the modified Reservation Message 500 to transmit endpoint 102.

Returning to FIG. 2, in step 204 after the transmit endpoint 102 (FIG. 1) has received the Reservation Message 500 (FIG. 5) sent from the receive endpoint 110 (FIG. 1) upstream in direction 132, the transmit endpoint 102 (FIG. 1) saves the routing information returned in the Record Route Object 416 (FIG. 5) of the Reservation Message 500 in a label table. The transmit endpoint 102 (FIG. 1) also stores the labels 624, 626, 628 (FIG. 6G) assigned to each of the IPv4 address 610, 612, 614 (FIG. 6G) in the Record Route Object 416 (FIG. 6G) for the primary tunnel 126 (FIG. 1) in the label table. The label table includes IPv4 addresses and corresponding labels for all nodes in the downstream portion of the primary tunnel 126 (FIG. 1).

The label table is created as the Reservation Message 500 is forwarded along the primary tunnel 126 (FIG. 1) in direction 132 by each of the intermediate nodes 104, 106, 108, the IPv4 address for each node in the primary tunnel 126 and the label for each communication link corresponding to the IPv4 address is added to the Record Route Object 416 as described for intermediate node_A 104 (FIG. 1). After the primary tunnel 126 (FIG. 1) has been established between the transmit endpoint 102 (FIG. 1) and the receive endpoint 110 (FIG. 1) through the Path Message 400 and Reservation Message 500, each of the intermediate nodes 104, 106, 108 and 120 stores a copy of the label table.

In step 206, the transmit endpoint 102 (FIG. 1) may transmit the data packets for the specified application to the receive endpoint 110 (FIG. 1) using the assigned label returned for communication link 112 (FIG. 1) in the Label Object 512 (FIG. 5) to transmit data packets along the primary tunnel 126 (FIG. 1).

Figure 7:
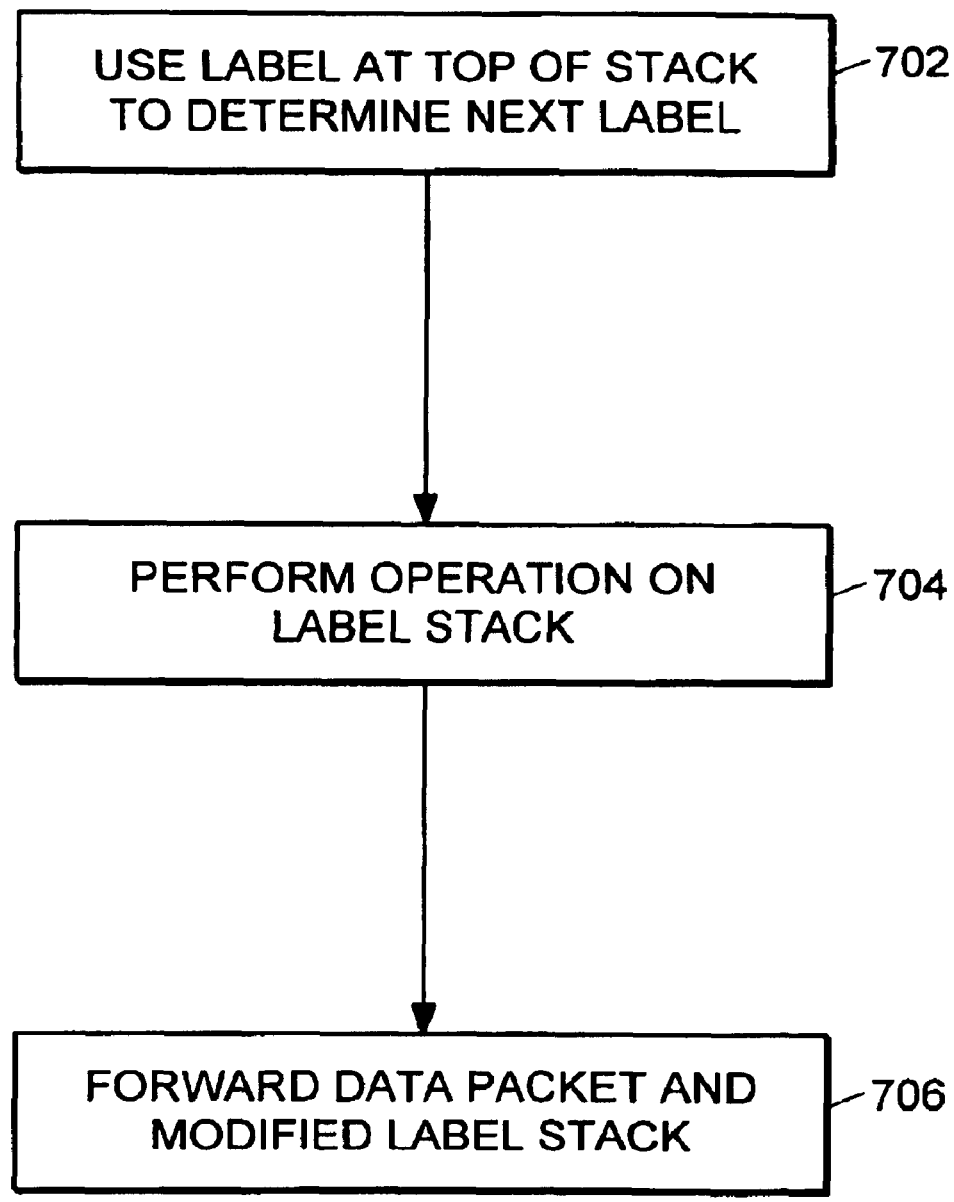
FIG. 7 is a flow diagram of a method for transferring data using preassigned labels along the tunnel shown in FIG. 1.
Figure 8A:
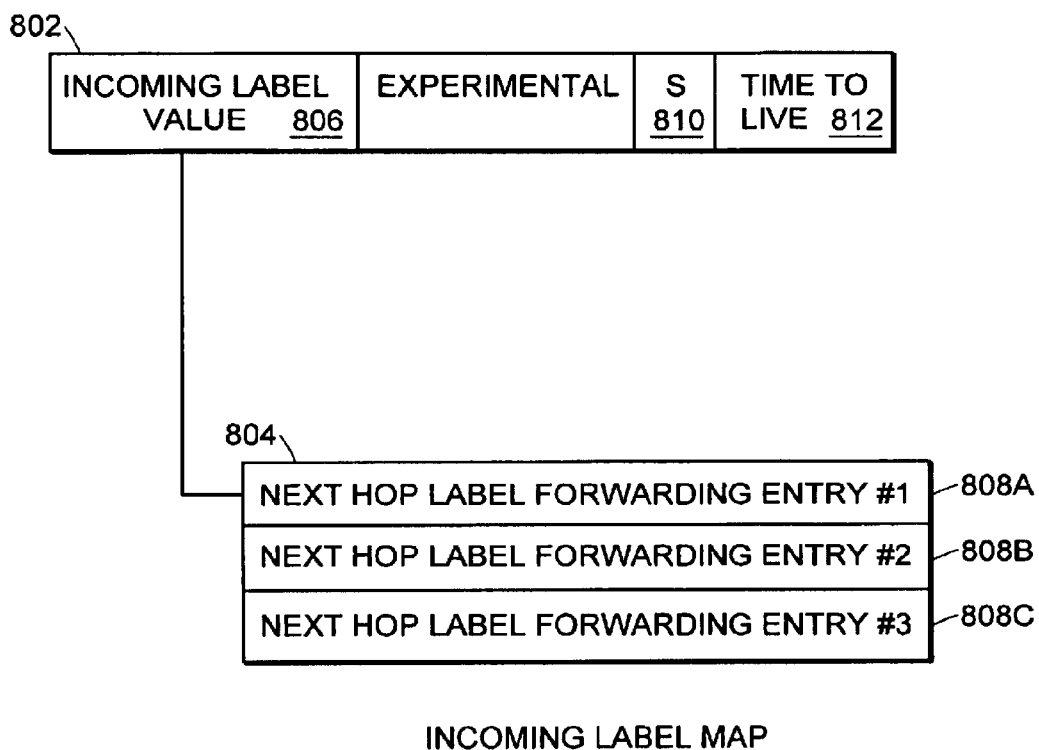
FIG. 8A shows a mapping of incoming labels using an incoming label map in each of the nodes along the tunnel shown in FIG. 1.
Figure 8B:
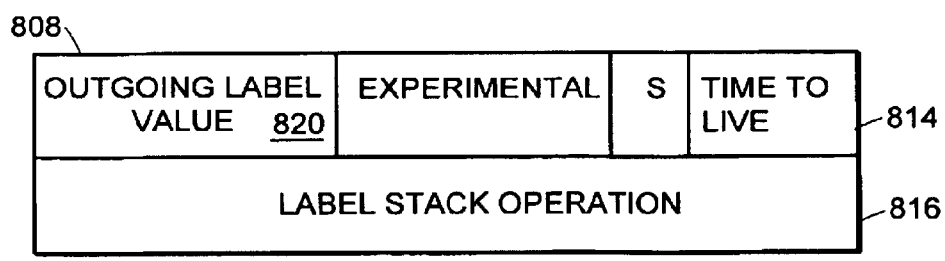
FIG. 8B shows the format of the next hop forwarding entry in the incoming label map shown in FIG. 8A.

FIG. 7 and FIGS. 8A–B in conjunction with FIG. 1 describe the steps for transmitting data between nodes in the primary tunnel 126 (FIG. 1).

FIG. 7 is a flow diagram of a method for transferring data using preassigned labels along a tunnel. In step 702, any one of the intermediate nodes 104, 106, 108 (FIG. 1) along the primary tunnel 126 (FIG. 1) receives an incoming data packet. The incoming data packet includes one or more labels stored in a label stack structure. The labels provide routing information for the data packet through the primary tunnel 126. The label on the top of the label stack structure is used by the receiving intermediate node 104, 106, 108 (FIG. 1) to determine the intermediate node to which the data packet is to be forwarded.

FIG. 8A shows a mapping of the incoming label 802 on the top of the stack structure to the incoming label map 804 stored in the intermediate node 104, 106, 108 (FIG. 1). The incoming label 802 includes an incoming label value 806, a Last Label bit 810 indicating if the incoming label 802 is the last label in the label stack structure and a Time To Live field 812. The intermediate node 104, 106, 108 (FIG. 1) uses the incoming label value 806 as an index into the incoming label map 804. The incoming label map 804 includes at least one Next Hop Label Forwarding Entry ("NHLFE") 808A-C. The incoming label value 806 in the incoming label 802 selects the NHLFE 808A-C corresponding to the incoming label value 806. For example, the incoming label 802 for the communication link 112 between transmitting endpoint 102 (FIG. 1) and intermediate node A 104 (FIG. 1) is sent to intermediate node A 104 (FIG. 1). Intermediate node_A 104 (FIG. 1) uses the incoming label value 806 in the incoming label 802 to index into the incoming label map 804 in intermediate node_A 104 (FIG. 1).

FIG. 8B shows the format of any of the NHLFEs 808A-C in the incoming label map 804. The Next Hop Label Forwarding Entry ("NHLFE") 808 in the incoming label map 804 is shown to include an outgoing label 814 and an operation field 816. The NHLFE 808 in the incoming label map 804 corresponding to the incoming label value 806 includes an outgoing label value 820 for the communication link 114 (FIG. 1) between intermediate node_A 104 (FIG. 1) and intermediate node_B 106 (FIG. 1).

Continuing with FIG. 7, in step 704 the intermediate node 104, 106, 108 (FIG. 1) performs an operation on the label stack structure. The operation to perform is defined by the value of the label stack operation field 816 (FIG. 8B) in the NHLFE 808 (FIG. 8B) in the incoming label map 804. For example, to forward the data packet along the primary tunnel 126 (FIG. 1) from intermediate node_A 104 (FIG. 1) to intermediate node_B 106 (FIG. 1) the value stored in the label stack operation field 816 indicates that the incoming label 802 is to be swapped with the outgoing label 814.

In step 706 the modified label stack and the data packet are forwarded to intermediate node_B 106 (FIG. 1).

Returning to FIG. 1 each intermediate node 104, 106 along the primary tunnel 126 has an outgoing label 814 (FIG. 8B) in its incoming label map 804 (FIG. 8A) corresponding to nodes adjacent to the intermediate node 104, 106, 108. For example, intermediate node_C 108 has a NHLFE 808 in its incoming label map 804 (FIG. 8A) corresponding to incoming label value 806 (FIG. 8A) sent by intermediate node_B 106 for the primary tunnel 126. However, intermediate node_C 108 does not have a NHLFE 808 in its incoming label map 804 (FIG. 8A) corresponding to the incoming label value 806 (FIG. 8A) sent by intermediate node_A 104.

Data packets may not be forwarded along the primary tunnel 126 if a failure occurs between adjacent nodes. For example, a failure may occur between intermediate node_A 104 and intermediate node_B 106 due to a physical link failure or a failure within intermediate node_B 106.

Figure 9:
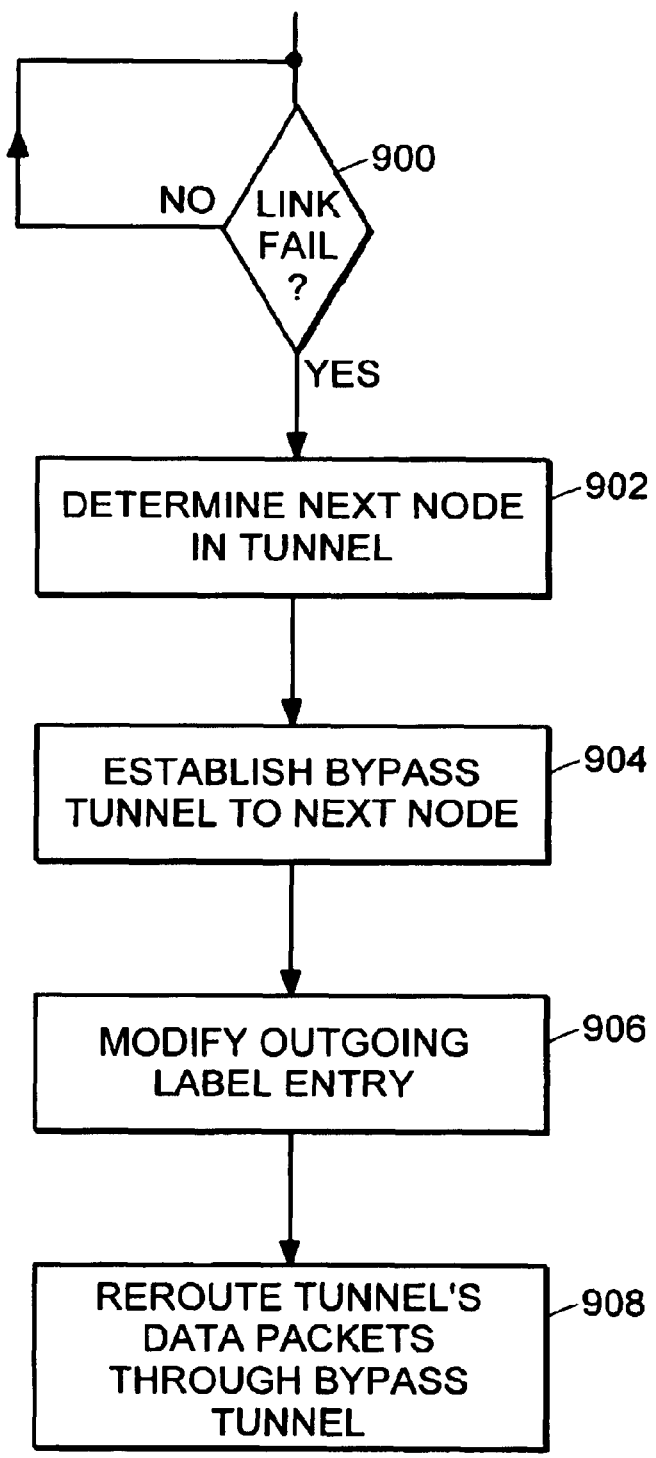
FIG. 9 is a flow diagram of a method for establishing a bypass tunnel and re-routing data packets for the tunnel through the bypass tunnel.

FIG. 9 shows the steps performed by intermediate node_A 104 to reroute data packets for the primary tunnel 126 along the bypass tunnel 128.

Referring to FIG. 9, in step 900 intermediate node_A 104 discovers that it can not forward data packets to intermediate node B 106 (FIG. 10) because of a communication link failure. In step 902 intermediate node_A 104 (FIG. 1) determines from its saved copy of the Record Route Object 416 (FIG. 6G) in the label table that intermediate node_C 108 (FIG. 1) is adjacent to intermediate node_B 106 (FIG. 1) in the primary tunnel 126 (FIG. 1). Intermediate node_A 104 (FIG. 1) also determines from the label table the incoming label 802 (FIG. 8A) assigned by intermediate node_C 108 (FIG. 1) to be transmitted with data packets from intermediate node_B 106 (FIG. 1) to intermediate node_C 108 (FIG. 1).

In step 904 intermediate node_A 104 (FIG. 1) establishes a bypass tunnel 128 through intermediate node_D 120 to intermediate node_C 108 using the same method for establishing the primary tunnel 126 described in conjunction with FIGS. 2 and 3.

In step 906 intermediate node_A 104 modifies the NHLFE 808 (FIG. 8A) in its incoming label table 804 (FIG. 8A) for the incoming label value 806 from the transmitting endpoint 102 (FIG. 1). Intermediate node_A 104 replaces the outgoing label for intermediate node_B 106 (FIG. 1) with the outgoing label for intermediate node_D 120 (FIG. 1) in the NHLFE 808 in the incoming label table 804 (FIG. 8A).

In step 908 intermediate node_A 104 redirects data packets for the primary tunnel 126 (FIG. 1) through the bypass tunnel 128 (FIG. 1) to intermediate node_C 108 (FIG. 1). Intermediate node_A 104 uses the incoming label 802 (FIG. 8A) from transmitting node 102 (FIG. 1) to index into intermediate node_A's 104 incoming label table 804 (FIG. 1). Intermediate node_A 104 adds the incoming label 802 (FIG. 8A) for intermediate node_C 108 for the primary tunnel 126 to the label stack associated with the data packet to be forwarded on the primary tunnel 126. Intermediate node_A 104 (FIG. 1) adds the outgoing label value 820 (FIG. 8B) from the NHLFE 808 in the incoming label table 804 (FIG. 1) to the top of the label stack and forwards the data packet and the associated label stack to intermediate node_D 120.

Returning to FIG. 7, in step 702 intermediate node_D 120 receives the data packet and associated label stack from intermediate node_A 104 and uses the incoming label value 806 on the top of the label stack to determine the outgoing label value 820 to be placed on the label stack. The incoming label value 806 is an index to a NHLFE 808 in the incoming label map 804 stored in intermediate node_D 120. Intermediate node_D determines from the label stack operation field 816 in the NHLFE 808 in the incoming label map 804 to pop the top label off the label stack. In step 706 intermediate node_D 120 forwards the modified label stack and the data packet to intermediate node_C 108.

In step 702 intermediate node_C 108 (FIG. 1) uses the incoming label value 802 at the top of the label stack associated with the data packet forwarded from intermediate node_D 108 (FIG. 1). The incoming label value 806 is the same as the incoming label value 806 forwarded from intermediate node_B 106 (FIG. 1) for the primary tunnel 126.

In step 704 intermediate node_C 108 (FIG. 1) pops the incoming label 802 from the label stack according to the label stack operation field 816 in the NHLFE 808 for the incoming label 802 from intermediate node_D 120 (FIG. 1). Intermediate node_C 108 (FIG. 1) seeing the same incoming label value 806 performs the same operation on the data packet's label stack that it performs for the data packet's label stack if the data packet was transferred along the primary tunnel 126 (FIG. 1).

In step 706 intermediate node_C 108 (FIG. 1) forwards the data packet with no associated label stack to the receive endpoint 110 (FIG. 1) of the primary tunnel 126 (FIG. 1).

Data packet forwarding on the tunnel is restored by rerouting the data packets through the bypass tunnel 128 (FIG. 1). In the embodiment described in conjunction with FIG. 9, steps 902 and 904 are performed after the communication link failure is detected. In another embodiment steps 902 and 904 may be performed before the communication link failure is detected, resulting in a faster restoration time for the primary tunnel 126.

It will be apparent to those of ordinary skill in the art that methods involved in the present invention may be embodied in a computer program product that includes a computer usable medium. For example, such a computer usable medium can consist of a read only memory device, such as a hard drive device or a computer diskette, having computer readable program code stored thereon.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method for repairing a failure in a communications link between a first node and a second node in a tunnel, wherein the tunnel has been established for transferring data between tunnel endpoints through a plurality of nodes by assigning a first label for transferring data on a first communications link between the first node and the second node and assigning a second label for transferring data on a second communications link between the second node and a third node comprising the steps of:

storing the first and second labels in the first node prior to any communications link failure, the first label assigned to an Internet Protocol address for the second node in the tunnel and the second label assigned to another Internet Protocol address for the third node in the tunnel, data being transferred between nodes in the tunnel using the assigned labels;

in the first node, upon detecting a failure in the communications link between the first node and the second node in the tunnel, determining, which downstream node in the tunnel is assigned to the second label from the labels stored in the first node; and redirecting data transfer for the tunnel around the failed communications link from the first node through a bypass node to the third node using the second label stored in the first node.

2. The method as claimed in claim 1 further comprising the step of:

establishing a bypass tunnel from the first node through the bypass node to the third node.

3. The method as claimed in claim 2 wherein the step of storing further comprises the steps of:

forwarding a message comprising a label table to each node in the tunnel;

in each node, adding the Internet Protocol address for the node and a label assigned to an upstream communications link between an upstream node and the node to the label table; and storing the label table in the node.

4. The method as claimed in claim 3 wherein the label assigned to the upstream communications link indexes another label assigned to a downstream communications link stored in the label table.

5. The method as claimed in claim 2 wherein the step of determining is performed before the communications link failure.

6. The method as claimed in claim 5 wherein the step of establishing is performed before the communications link failure.

7. The method as claimed in claim 1 wherein the second label is used by the bypass node to transfer data to the third node.

8. The apparatus as claimed in claim 1 wherein the tunnel is established using a Resource Reservation Protocol.

9. A computer program product for repairing a failure in a communications link between a first node and a second node in a tunnel, wherein the tunnel has been established for transferring data between tunnel endpoints through a plurality of nodes by assigning a first label for transferring data on a first communications link between the first node and the second node and assigning a second label for transferring data on a second communications link between the second node and a third node, the computer program product comprising a computer usable medium having computer readable code thereon, including program code which:

stores the first and second labels in the first node prior to any communications link failure the first label assigned to an Internet Protocol address for the second node in the tunnel and the second label assigned to another Internet Protocol address for the third node in the tunnel, data being transferred between nodes in the tunnel using the assigned labels;

in the first node, upon detecting a failure in the communications link between the first node and the second node in the tunnel, determines, which downstream node in the tunnel is assigned to the second label from the labels stored in the first node; and redirects data transfer for the tunnel around the failed communications link from the first node through a bypass node to the third node around the failed communications link using the second label stored in the first node.

10. An apparatus for repairing a failure in a communications link between a first node and a second node in a tunnel, wherein the tunnel has been established for transferring data between tunnel endpoints through a plurality of by assigning a first label for transferring data on a communications link between the first node and the second node and assigning a second label for transferring data on a communications link between the second node and a third node comprising:

a bypass tunnel routine;

means, within the bypass tunnel routine, for storing the first and second labels in the first node prior to any communications link failure, the first label assigned to an Internet Protocol address for the second node in the tunnel and the second label assigned to another Internet Protocol address for the third node in the tunnel, data being transferred between nodes in the tunnel using the assigned labels;

means, within the bypass tunnel routine in the first node, for determining upon detecting a failure in the communications link between the first node and the second node in the tunnel, which downstream node in the tunnel is assigned to the second label from the labels stored in the first node; and means, within the bypass tunnel routine for redirecting data transfer for the tunnel around the failed communications link from the first node through a bypass node to the third node using the second label for the communications link between the second node and the third node stored in the first node.

11. The method as claimed in claim 10, further comprising a means, within the bypass tunnel routine for establishing a bypass tunnel from the first node through a bypass node to the third node.

12. The apparatus as claimed in claim 11 wherein the means for storing further comprises:

means for forwarding a message comprising a label table to each node in the tunnel;

means, in each node, for adding the Internet Protocol address for the node and a label assigned to an upstream communications link between an upstream node and the node to the label table; and means for storing the label table in the node.

13. The apparatus as claimed in claim 12 wherein the label assigned to the upstream communications link indexes another label assigned to a downstream communications link stored in the label table.

14. The apparatus as claimed in claim 11 wherein the means for determining determines the connected nodes before the communications link failure.

15. The apparatus as claimed in claim 14 wherein the means for establishing establishes the bypass tunnel before the communications link failure.

16. The apparatus as claimed in claim 10 wherein second label is used by the bypass node to transfer data to the third node.

17. An apparatus for switching from a reserved first path between a source node and a destination node, the reserved first path comprising one or more interconnected nodes, to a reserved second path comprising one or more interconnected nodes comprising:

a label store routine which stores a plurality of labels in the node prior to any communications link failure, each of the labels assigned to an Internet Protocol address for an immediate downstream node in the tunnel, data being transferred between nodes in the tunnel using the assigned labels;

a node connection routine, which upon detecting a failure in a communications link between the node and the immediate downstream node in the tunnel, determines the next downstream node in the tunnel connected to the immediate downstream node from the labels stored by the label store routine in the node; and a redirect routine which redirects data transfer for the tunnel around the failed communications link from the first node through the second path to the third node using the second label stored in the node.

18. The apparatus as claimed in claim 17 further comprising a bypass tunnel establish routine which establishes a bypass tunnel from the first node through a bypass node to the third node.

19. The apparatus as claimed in claim 18 wherein the label store routine further comprises:

a message forwarding routine which forwards a message comprising a label table to each node in the tunnel;

a label table routine which adds the Internet Protocol address for the node and a label assigned to an upstream communications link between an upstream node and the node to the label table; and a store label table routine which stores the label table in the node.

20. The apparatus as claimed in claim 18 wherein the node connection routine determines the connected nodes before the communications link failure.

21. The apparatus as claimed in claim 18 wherein the bypass tunnel routine establishes the bypass tunnel before the communications link failure.

22. A method for repairing a failure in a communications link between a first node and a second node in a tunnel, wherein the tunnel has been established for transferring data between tunnel endpoints through a plurality of nodes by assigning a first label for transferring data on a first communications link between the first node and the second node and assigning a second label for transferring data on a second communications link between the second node and a third node comprising the steps of:

storing the first and second labels in the first node prior to any communications link failure, the first label assigned to an Internet Protocol version 4 address for the second node in the tunnel and the second label assigned to another Internet Protocol version 4 address for the third node in the tunnel, data being transferred between nodes in the tunnel using the-assigned labels;

in the first node, upon detecting a failure in the communications link between the first node and the second node in the tunnel, determining, which downstream node in the tunnel is assigned to the second label from the labels stored in the first node; and redirecting data transfer for the tunnel around the failed communications link from the first node through a bypass node to the third node using the second label stored in the first node.

23. A method for repairing a failure in a communications link between a first node and a second node in a tunnel, wherein the tunnel has been established for transferring data between tunnel endpoints through a plurality of nodes by assigning a first label for transferring data on a first communications link between the first node and the second node and assigning a second label for transferring data on a second communications link between the second node and a third node comprising the steps of:

storing the first and second labels in the first node prior to any communications link failure, the first label assigned to an Internet Protocol version 6 address for the second node in the tunnel and the second label assigned to another Internet Protocol version 6 address for the third node in the tunnel, data being transferred between nodes in the tunnel using the assigned labels;

in the first node, upon detecting a failure in the communications link between the first node and the second node in the tunnel, determining, which downstream node in the tunnel is assigned to the second label from the labels stored in the first node; and redirecting data transfer for the tunnel around the failed communications link from the first node through a bypass node to the third node using the second label stored in the first node.

24. An apparatus for repairing a failure in a communications link between a first node and a second node in a tunnel, wherein the tunnel has been established for transferring data between tunnel endpoints through a plurality of by assigning a first label for transferring data on a communications link between the first node and the second node and assigning a second label for transferring data on a communications link between the second node and a third node comprising:

a bypass tunnel routine;

means, within the bypass tunnel routine for storing the first and second labels in the first node prior to any communications link failure, the first label assigned to an Internet Protocol version 4 address for the second node in the tunnel and the second label assigned to another Internet Protocol version 4 address for the third node in the tunnel, data being transferred between nodes in the tunnel using the assigned labels; p1 means, within the bypass tunnel routine in the first node, for determining upon detecting a failure in the communications link between the first node and the second node in the tunnel, which downstream node in the tunnel is assigned to the second label from the labels stored in the first node; and means, within the bypass tunnel routine for redirecting data transfer for the tunnel around the failed communications link from the first node through a bypass node to the third node using the second label for the communications link between the second node and the third node stored in the first node.

25. An apparatus for repairing a failure in a communications link between a first node and a second node in a tunnel, wherein the tunnel has been established for transferring data between tunnel endpoints through a plurality of by assigning a first label for transferring data on a communications link between the first node and the second node and assigning a second label for transferring data on a communications link between the second node and a third node comprising:

a bypass tunnel routine;

means, within the bypass tunnel routine, for storing the first and second labels in the first node prior to any communications link failure, the first label assigned to an Internet Protocol version 6 address for the second node in the tunnel and the second label assigned to another Internet Protocol version 6 address for the third node in the tunnel, data being transferred between nodes in the tunnel using the assigned labels;

means, within the bypass tunnel routine in the first node, for determining upon detecting a failure in the communications link between the first node and the second node in the tunnel, which downstream node in the tunnel is assigned to the second label from the labels stored in the first node; and means, within the bypass tunnel routine for redirecting data transfer for the tunnel around the failed communications link from the first node through a bypass node to the third node using the second label for the communications link between the second node and the third node stored in the first node.

26. A method for repairing a failure in a communications link between nodes in a tunnel, wherein the tunnel has been established for transferring data from a transmit endpoint to a receive endpoint through the nodes using labels assigned to each communications link in the tunnel, each of the communications links assigned a different label comprising the steps of:

storing all of the assigned labels in each of the nodes prior to any communications link failure, each label assigned to an Internet Protocol address for a node, data being transferred on a communications link between nodes in the tunnel using the assigned label, the assigned label received by a node identifying the communications link to an immediate downstream node in the tunnel;

in a node, upon detecting a failure in the communications link to the immediate downstream node, determining a next label assigned to the next communications link to a next downstream node from the labels stored in the node; and redirecting data transfer for the tunnel around the failed communications link to bypass the immediate downstream node, data transfer redirected from the node to the next downstream node through a bypass node using the next label stored in the node.

* * * * *